United States Patent [19]

Shulman et al.

[11] 3,914,400

[45] Oct. 21, 1975

[54] STABLE ANTIGEN-ERYTHROCYTES FOR MEASURING ANTIBODIES AGAINST TOXOPLASMA ORGANISM

[75] Inventors: N. Raphael Shulman, Kensington; Ceceil R. Coleman, Silver Spring, both of Md.

[73] Assignee: The Government of the United States, Washington, D.C.

[22] Filed: May 21, 1973

[21] Appl. No.: 362,308

[52] U.S. Cl..................... 424/12; 260/112 B; 424/3
[51] Int. Cl.²................. C12K 1/00; G01N 31/02; G01N 33/16
[58] Field of Search................................. 424/3, 12

[56] References Cited
UNITED STATES PATENTS
3,714,345   1/1973   Hirata.................................. 424/12

OTHER PUBLICATIONS
Jennis, Aust. J. Exp. Biol. Med. Sci., Vol. 44, 1966, pp. 317–322.
Thorburn, Lab–Lore, Welcome Service in Lab. Tech., Wellcome Reagents Div. Burroughs Welcome Co. Res. Triangle NC, Abs. No. 649, p. 269, Vol. 5, No. 9, August 1973, (citing J. Clin. Path., Vol. 25, 762, 1972).
Ling, Brit. J. Haemt., Vol. 7, July, 1961, pp. 299–302.
Hirata, J. Immuno, Vol. 130, 1969, p. 343.

*Primary Examiner*—Albert T. Meyers
*Assistant Examiner*—A. P. Fagelson
*Attorney, Agent, or Firm*—Browdy and Neimark

[57] ABSTRACT

Human erythrocytes are stabilized with pyruvic aldehyde to which are bonded the toxoplasma antigens to provide a sensitized medium for performing the subsequent hemagglutination reaction. This technique can be used for measuring antibodies against the toxoplasma organism if the suspension of treated cells and antigens is stirred under a time-temperature relationship between two hours at room temperature and 10 minutes at 50°C, using an antigen containing from 0.5 to 2 units of protein at 280 m$\mu$ wavelength and a 1 cm lightpath; otherwise, nonspecific agglutination occurs.

5 Claims, No Drawings

STABLE ANTIGEN-ERYTHROCYTES FOR MEASURING ANTIBODIES AGAINST TOXOPLASMA ORGANISM

FIELD OF THE INVENTION

The present invention relates to a stable hemagglutination technique for measuring antibodies against the toxoplasma organism and, more particularly, to an improved process for detecting toxoplasma antibodies and improved procedures for making such a process possible.

BACKGROUND OF THE INVENTION

Approximately 1 out of 1,000 new born babies are infected with toxoplasmosis. Accordingly, anti-toxoplasma tests are routine in most nurseries and obstetrical clinics. However, in spite of the fact that good, simple and inexpensive tests are currently available for other antibodies, heretofore such tests have not been successfully applied for detecting toxoplasmosis antibodies, and the techniques which have been required, performed on hundreds of thousands of patients per year in the United States alone, have been more complex and expensive than desirable.

The current tests available for toxoplasma antibodies include fluorescent antibody tests [Sulzer, Wilson and Hall, "Toxoplasma gondii: Polar Staining in Fluroescent Antibody Test" *Exper. Parasitology*, Vol. 29 (1971); pages 197-200], microprecipitation techniques [Hubner, J. and Uhlikova, M. "Use of the microprecipitation method in agar gel (MPA) in the diagnostics of toxoplasmosis. II. Correlation of MPA and the SFT (Sabin-Feldman Dye Test) with Results of Toxoplasma Isolation Experiments." *Journal of Hygeine, Epidemiology, Microbiology and Immunology*, Vol. 14 (1970); page 499]; latex agglutination technique ]Lunde, M.N. and Jacobs, L. "Evaluation of a latex agglutination test for toxoplasmosis." *Journal of Parasitology*, Vol. 53,5 (1967); pages 933–936] and hemogglutination technique [Mitchell, R. G. and Green, C. A. "The Haemagglutination test for toxoplasm antibodies." *Journal of Clinical Pathology*, Vol. 13 (1960); page 331].

The fluorescent antibody tests are currently, commercially available and are in common usage; in addition, such tests are sensitive and accurate. However, their defect is that they are quite expensive and time-consuming, depending on a microscopic reading that requires skill as well as using expensive and labile reagents.

The currently available hemagglutination tests depend on attaching toxoplasma antigens to sheep red cells using tannic acid as a coupling agent. The labelled cells must be produced daily and human sera must be adsorbed to prevent nonspecific agglutination with sheep cells. This method is also accurate, but is unduly complex and expensive.

There is also an agglutination test involving the adsorption of toxoplasma antigens onto polystyrene latex particles. The latex particle test gives a relatively high incidence of false positive reactions, is not equivalent in sensitivity and accuracy to the above mentioned hemagglution tests and furthermore, has the drawback of requiring incubation overnight prior to reading. Accordingly, this test is not satisfactory. Additionally, there is little information on the stability of latex tests in general, although, as a rule, reagents which depend on latex absorption are not stable.

From the above, it is clear that the previously available techniques for measuring antibodies against the toxoplasma organism have not been satisfactory for one reason or another. Nevertheless, improved techniques have been proposed for detecting antibodies against other organisms than toxoplasmosis; but these techniques have not been successfully applied heretofore against the toxoplasmosis organism. Reference is made to Ling: "The Attachment of Proteins to Aldehyde-Tanned Cells", *British Journal of haematology*; Vol. 7 (1961), page 299 and to Hirata and Brandriss, "passive Hemagglutination Procedures for Protein and Polysaccharide Antigens using Erythrocytes Stabilized by Aldehydes", *Journal of Immunology*, Vol. 100 (1968), No. 3. Ling described the preparation of human red blood cells for indirect hemagglutination tests using pyruvic aldehyde as the preferred stabilizer. While Hirata et al. does not appear to suggest the use of human red blood cells, a detailed stabilization procedure using pyruvic aldhyde is given. Also, note Hirata et al., *Journal of Immunology*, Vol. 130 (1969)page 343; Pressman et al., *Journal of Immunology*, Vol. 44, page 101; and Ling, *The Biochemical Journal*, Vol 77 (1960), page 12P. Of these latter three publications, Ling mentions that proteins may be attached or coated by heating the protein plus the cell suspension at low ionic strength and, the reagents are stable for at least three months; Hirata et al. discuss a passive hemagglutination procedure in which antigen-coated erythrocytes could be stored frozen or in a lyophilized state, yielding highly sensitive hemagglutination titers.

The patent literature appears less pertinent. Fulthorpe U.S. Pat. No. 3,322,634 relates to the production of immunological reagents for use in hemagglutination tests, the reagents comprising antigen-sensitized mammal red blood cells which agglutinate in the presence of corresponding antibodies. However, this procedure requires treatment with a mordant or bonding agent which is a polyphenol or quinone of low molecular weight, as well as an aldehyde. The test is mentioned as being useful to detect protein antigens including HCG, Serum albumin, gamma globulin, insulin, tetanus toxoid and diptheria toxoid; toxoplasmosis is not mentioned.

Ingraham U.S. Pat. No. 3,096,250 discusses the coupling of diagnostic antigens to erythrocytes and their lack of stability, necessitating storage in either frozen or lyophilized condition. Ingraham seeks to provide a stable and highly sensitive preparation by coupling the erythrocyte, preferably a human red cell, to one or more proteinaceous antigen molecules. Also of some interest is the patent to Czizmas et al. U.S. Pat. No. 3,553,310, which shows the coupling of $\alpha,\beta$-unsaturated aldehydes with biologic particles to form stabilized particles for immunological testing.

It will thus be seen that while a variety of hemagglutination techniques have previously been available for testing for various antigens, none of these have heretofore been successfully applied to the problem of detecting the toxoplasmosis antigen and, accordingly, the art has had to rely upon the prior tests which are more cumbersome, expensive and undesirable.

SUMMARY OF THE INVENTION

It is, accordingly, an object of the present invention to overcome the deficiencies of the prior art, such as indicated above.

It is another object of the present invention to provide a stable hemagglutination technique for measuring antibodies against the toxoplasma organism.

It is another object of the present invention to provide a stable reagent that can be utilized in a simple, rapid and precise test for detecting antibodies against the organism responsible for toxoplasmosis.

It is another object of the present invention to provide a stable reagent which can be stored at room temperature, at 5°C, in the frozen state or lyophilized, and which can be used in a simple and rapid test for detecting the toxoplasma antibody, which test does not require skilled personnel.

It is another object of the present invention to provide a process which permits the utilization of improved techniques — which have been previously used for detecting other antibodies — for specifically detecting the toxoplasmosis antigen.

These and other objects are attained by the utilization of human erythrocytes with pyruvic aldehyde in the manner described in detail below, for sensitizing cells and for performing the subsequent hemagglutination reaction. In particular, to successfully use this technique against the toxoplasmosis antigen, and in order to avoid nonspecific agglutination, it has now been found that there is a critical time-temperature relationship for mixing the suspension of stabilized cells and antigen, and that it is also necessary to control the protein concentration of the antigen.

The nature and advantages of the instant invention including further objects, will be more apparent from the following detailed description of a specific embodiment:

DETAILED DESCRIPTION OF PREFERRED EMBODIMENT

Human O negative red blood cells from blood collected in ethylenediamine tetra-acetate were washed four times with 0.147 M sodium chloride and adjusted to an 8 percent suspension by volume with 0.11 M phosphate buffered in saline, pH 7.2. Equal volumes of the 8 percent cell suspension were mixed with 3 percent pyruvic aldehyde solution in phosphate buffered saline adjusted pH 7.2 with 2N sodium hydroxide. The mixture was rotated on a continuous stirring platform for approximately 16 hours at room temperature. The cells were then washed four times with 0.147 M sodium chloride, were adjusted to a 40 percent suspension and stored at 5°C in the same sodium chloride solution.

In preparing cells coated with toxoplasma antigen the 40 percent suspension of cells treated with pyruvic aldehyde was washed 5 times with 0.1 M acetate buffer, pH 4. Then the cells were mixed at a ratio at 1 part cell suspension to 3 volumes of antigen and 1 volume of 0.1 M acetate buffer pH 4. The antigen consisted of a water soluble lysate of toxoplasma, prepared similar to those described in references : Jacobs, L. and Lunde, M. N. "A Hemagglutination test for toxoplasmosis," *Journal of Parasitology*, pages 308–314; and Jacobs and Lunde, id. Antigen could be obtained from tissue culture of animal origin (e.g. mouse culture) and be equally effective. The proper dilution of antigen was determined by a preliminary block titration with known positive and negative sera as reported in most hemagglutination techniques (e.g.: Vyas, g.n. and Shulman, N. R., "hemagglutination Assay for Antigen and Antibody Associated with Viral Hepatitis;" *Science*, Vol. 170 (1970), pages 332–333.).

The suspension of cells and antigen was continuously stirred for two hours at room temperature, or 10 minutes at 50°C, or over night at 5°C, or combinations of these times and temperatures. The best time was found to be 2 hours at room temperature, or 10 minutes at 50°C. After coating the cell, preparations were washed five times with 0.11 M phosphate buffer pH 7.2 and suspended in phosphate buffered saline at the same pH containing 1 percent normal human serum. A cell preparation without antigen was always treated similarly as a control.

Variations of the technique, such as changing the time or temperature of incubation, were explored. Excess coating of the cells by longer times at high or low temperature caused nonspecific agglutination. The use of too much antigen or antigen that contained too much extraneous protein also gave nonspecific agglutination. The protein concentration that we used for antigen is in the range of 0.5 to 2 units of density at 280 m$\mu$ wavelength and a 1 cm light path.

The cells prepared as above could be stored for use for at least 2 weeks at 5°C, at least three months frozen and at least three months after lyophilization.

To test for anti-toxoplasmosis by hemagglutination, 0.05 ml (two drops) of the unknown serum at a dilution of ¼ is added to the first well of a V-bottom microtiter plate and is further diluted in twofold serial dilutions using TAP buffers as a diluent.

The buffer consists of 0.05 M sodium phosphate buffer in 0.85 percent NaCl, pH 7.3, containing 0.5 percent bovine serum albumin, 0.0025 percent polyvinyl pyrrolidone, and a 1:20,000 dilution of Tween 80; the special phosphate buffer is made by adding 115 ml of 0.2 M Na$_2$PO$_4$ and 385 ml of 0.2 M Na$_2$HPO$_4$ + 17 g NaCl + 50 mg polyvinyl pyrrolidone + 1/10 ml of Tween 80 to a volumetric flask and bringing the total volume to 2 liters with distilled water; a 5 percent solution of bovine serum albumin in saline stored at 20°C. in 5 ml aliquots; one tube (5 ml) is diluted with 45 ml of the special phosphate buffer for use; the combined buffer can be stored at 5°C. for 1–2 days.

Dilutions are performed with standard loops that pick up 0.025 ml of solution for transfer to sequential wells in which one drop (0.025 ml) of special buffer is placed. Standard pipettes made to deliver drops of 0.025 ml can be used. As an example, dilutions are ¼ to 1/8192. After dilutions are made, one drop (0.025 ml) of coated cells is added to each well. The plate is then incubated for 30 min. at room temperature, and centrifuged at 1,800 r.p.m. for 2 min. in an International Centrifuge (6 inch radius) with a holder for the microtiter plates. The microtiter plate is then placed at an angle of approximately 60° for 12' before reading.

Agglutinated cells appear as dots and unagglutinated cells appear as a line of cells streaming down the bottom of the well. In the example, results were positive to dilution 1/64; were ± at 1/128; and were negative at 1/256. As control, a ¼ or greater dilution of each serum sample is used with one drop of uncoated cells suspended in TAP buffer.

The sensitivity of their test using a large panel of normal sera and sera known to give positive reactions showed 100 percent concordance with the immunofluorescent test for anti-toxoplasmosis although titers of antibodies tended to be higher by hemagglutination.

It will be understood that the invention is not limited to the embodiment disclosed above which is illustratively offered, and that modifications may be made without departing from the invention. For example, certain details of the standard hemagglutination techniques of the prior art, such as those referenced above, may be substituted for details of operation of the above disclosed embodiment, so long as the process of the present invention is followed regarding contact of the antigen with the pyruvic aldehyde stabilized human red blood cells.

Accordingly, the foregoing description of the specific embodiment will so fully reveal the general nature of the invention that others can, by applying current knowledge, readily modify such specific embodiment without departing from the generic concept, and, therefore, such modifications should and are intended to be comprehended within the meaning and range of equivalents of the disclosed embodiement. It is to be understood that the phraseology or terminology employed herein is for purposes of description and not of limitation.

What is claimed is:

1. In the method of bonding a pyruvic aldehyde stabilized human erythrocyte to a protein antigen, the improvement comprising contacting a suspension of said cells with said antigen while stirring for a period between 2 hours at room temperature and 10 minutes at 50°C, and wherein the protein concentration of antigen in the cell suspension is in the range of 0.5 to 2 units of density at 280 m$\mu$ wavelength and a 1 cm lightpath, said antigen being the toxoplasmosis antigen, said cells being type 0 negative human erythrocytes.

2. The stable cell preparation prepared by the process of claim 1.

3. The cell preparation of claim 2 in frozen form.

4. The cell preparation of claim 2 in lyophilized form.

5. In the passive hemagglutination test for antibodies against the toxoplasma organism, the improvement comprising using the stable cell preparation of claim 2 for detecting and measuring said antibodies.

* * * * *